United States Patent [11] 3,607,789

| [72] | Inventors | Gunciappa Krishna Murthy;<br>Raymond H. Caley, both of Toronto,<br>Ontario, Canada |
|---|---|---|
| [21] | Appl. No. | 726,198 |
| [22] | Filed | May 2, 1968 |
| [45] | Patented | Sept. 21, 1971 |
| [73] | Assignee | Precision Electronic Components Ltd.<br>Toronto, Ontario, Canada |

[54] ELECTROCONDUCTIVE GLAZE AND METHOD FOR PREPARATION
16 Claims, No Drawings

[52] U.S. Cl. .................................................. 252/514,
252/518, 117/227, 106/47
[51] Int. Cl. ............................................... H01b 1/06,
C03c 3/12
[50] Field of Search ............................................ 252/512,
514, 518; 106/47, 53; 117/227

[56] References Cited
UNITED STATES PATENTS

| 2,837,487 | 6/1958 | Huttar | 117/227 |
| 3,462,298 | 8/1969 | Ikeda et al. | 106/47 |
| 3,479,216 | 11/1969 | Counts et al. | 117/227 |
| 3,320,043 | 5/1967 | Mackenzie | 106/57 |
| 3,352,797 | 11/1967 | Kim | 252/518 |
| 3,378,362 | 4/1968 | Mackenzie | 106/47 |
| 3,392,312 | 7/1968 | Carman | 106/47 |

*Primary Examiner*—Douglas J. Drummond
*Attorneys*—H. Hume Mathews and Edmund W. Bopp

ABSTRACT: An electroconductive glaze and process for formation thereof. The glaze comprises a particulate dispersion of conductive metals and/or metal oxides in a germanate glass matrix. The glaze is preferably formed by firing a paste comprising an intimate admixture of the particulate component with a crystallized, finely ground, lead germanate-based glass.

3,607,789

ELECTROCONDUCTIVE GLAZE AND METHOD FOR PREPARATION

BACKGROUND OF THE INVENTION

This invention relates to electroconductive glazes and to processes for manufacture thereof.

Within recent years, a new class of ceramiclike electroconductive materials has been developed which has found wide application to electronics technology generally and to microelectronics technology in particular. The materials alluded to, frequently referred to as electroconductive glazes, externally resemble ceramics, and typically comprise dispersions of metals, conductive oxides, semiconductors, etc., in glass matrices. A produce of the general type to which we allude is disclosed, for example, in U.S. Pat. No. 3,238,151 to K. H. Kim, wherein an electroconductive glaze is described comprising a fine dispersion of thallium oxide in a fired borosilicate glass matrix. Essentially resistive compositions of this type are also disclosed, for example, in U.S. Pats. Nos. 3,052,573; 3,154,503; and 3,329,526. Similarly, electroconductive glazes which in a relative sense may be regarded as conductive in nature, are widely known; a number of these latter compositions, for example, are available commercially from the DuPont Company (Wilmington, Del.) under product designations such as 6998 (Pt-Au glass), and 6730 (silver-glass).

It is significant to note that in spite of the fact that a wide variety of electroconductive glazes have thus been taught in the art, in virtually all instances the glass phase utilized to disperse the conductive phase has been a borosilicate glass. It is also of interest to note in reviewing the prior art, that the technique for formation of the final electroconductive glaze produce typically involves intermixing the conductive phase with the aforementioned borosilicate glass (usually in a frit form), and in the presence of suitable temporary binders firing the resulting paste to form the desired product. While little careful investigation has been undertaken in this technology establishing to what extent the aforementioned facts are responsible, it is a well-known operative fact to those skilled in the art that electroconductive glazes have been particularly deficient with respect to reproducibility thereof from sample to sample. In particular, while it has proved feasible to develop given compositions, and particularly specific samples thereof, which display temperature coefficient of resistance characteristics (TCR's) rendering such materials highly useful in microcircuitry applications, yet it has all too often developed that the manufacturers of such materials could not demonstrate sufficient reproducibility from sample to sample to encourage widespread use of their products.

Another significant deficiency present in the prior art arises from the fact that it has in the past generally been necessary to prepare separate and distinct paste compositions for each resistance range where one desired to form glaze products. In general, no one composition could be employed over a wide resistance range, and it was thus necessary to intermix high and low conductivity compositions each time one desired to cover a new range.

In accordance with the foregoing, it may be regarded as an object of the present invention to provide a class of electroconductive glazes displaying outstanding and highly reproducible electrical characteristics, particularly with respect to TCR characteristics thereof.

It is a further object of the present invention to provide a method for formation of electroconductive glazes which achieves outstanding reproducibility qualities in the resulting products.

It is another object of the present invention to provide a novel class of electroconductive glazes displaying thermal stability properties superior to the borosilicate glazes of the prior art.

It is yet a further object of the invention to provide a class of electroconductive glazes useful over a very wide conductivity range.

SUMMARY OF THE INVENTION

Now in accordance with the present invention, it has been found that the objects previously set forth can be achieved by utilizing with the dispersed conductive component of the electroconductive paste, a devitrified, i.e., crystallized, lead germanate-based glass. In accordance with the invention the crystalline germanate material is prepared by admixing suitable oxides, heat treating said oxides to yield a devitrified or crystalline form, and then comminuting the resulting material to a suitable particulate composition. The resulting particulate crystalline material is thereafter admixed with conductive powders and temporary binders to yield the usual pastelike material, which paste is then fired to yield the final glaze product.

Although a complete explanation cannot be given for such result, it is observed that the glaze products created by the new process set forth, have outstanding electrical characteristics, particularly with respect to TCR's, and that furthermore such products display outstanding reproducibility of electrical characteristics from sample to sample. Purely as a hypothesis, it is believed that the excellent functional characteristics mentioned result partially from electrical and chemical characteristics imparted by the germanate materials (particularly by the peculiar electronic structure of germanium), and partially from the fact that the glazes are prepared from a paste including the germanate materials in a crystalline form. Hypothesizing further, it is suggested, on the latter count, that the use of the crystalline germanate material assures that a sharply defined melting point will be present in the pastes being fired; such result is in contrast to the indeterminate continuous softening process that occurs where the typical borosilicate glass frit is present in a fired paste composition. It is believed that the presence of such a distinct melting range prevents the point-to-point variations in agitation and physical disruption of the paste material which is believed to occur in the course of firing the compositions of the prior art.

DESCRIPTION OF PREFERRED EMBODIMENTS

In accordance with the present invention, the crystalline material which is to be admixed with conductive components is formed from an initial composition based largely on germanium dioxide and lead oxide. Preferable starting compositions for preparation of the crystalline material are as follows, all percentages being indicated on a weight basis:

| Oxide | Weight % |
| --- | --- |
| $GeO_2$ | 45–70 |
| $PbO$ | 20–55 |
| $In_2O_3$ | 0–5 |
| $B_2O_3$ | 0–2 |
| $ZnO$ | 0–2 |
| $Al_2O_3$ | 0–1 |
| $ZrO_2$ | 0–1 |
| $Bi_2O_3$ | 0–1 |
| $MnO_2$ | 0–1 |

In a preferred procedure compositions as indicated are thoroughly blended in a suitable liquid medium, dried, melted, usually in the range of 950° to 1350° C., and poured into a mold to yield a glasslike lead germanate material. The latter is thereafter cooled, broken up, and milled to a fine consistency, typically a 20 micron power. The latter is thereafter compacted at intermediate pressures e.g., 4,000 p.s.i., and subsequently heat-treated at intermediate temperatures, e.g., 700° C., as a result of which recrystallization of the formerly glasslike material is brought about. The resulting crystalline material is reground to a fine consistency, and is then ready for blending with the conductive component.

Alternatively to the procedure of the prior paragraph, the crystalline material cited may be prepared by a solid state reaction. For example, oxides of germanium and boron are combined with reactive components such as carbonates and nitrates of lead, indium, zinc, aluminum, zirconium, bismuth and/or manganese, and mixed thoroughly in a liquid medium, dried, pressurized into a pellet, and heat-treated suitably to bring about the solid state reactions among the components which yields the crystalline material. While the product resulting from this technique is identical to that yielded by passing the oxides through an intermediate glass stage, this latter method will serve to emphasize the fact the crystalline germanate materials are quite distinct from glasses in their physical structure, and in fact need not up to the point of their formation ever have passed through the amorphous form of a true glass.

The conductive component utilized in accordance with the invention is chosen from a wide variety of such elements known to be useful in formation of glaze materials. Excluding such contributions to the pastes as may be made by temporary binders, inert fillers, and the like, the ratio present between crystalline germanate material and conductive component will be governed by the preferable weight percentages: crystalline material, 60 to 90 percent; conductive component, 40 to 10 percent. Typically, the conductive component will include one or more noble metals and one or more semiconducting oxides. Colloidal gold in admixture with platinum oxide, with small additional quantities of ruthenium oxide has proved to be a particularly effective combination. Preferred compositions corresponding to this latter formulation will include by weight of the total composition (again excepting temporary binders and/or inert fillers): 4 to 30 percent gold, 4 to 20 percent platinum oxide, and up to 10 percent ruthenium dioxide. Additionally, in some instances a few percent of platinum is found to improve the electrical characteristics of these preferred compositions.

After conductive components and the finely powdered crystalline materials are suitably formulated, the two are blended into a paste by adding thereto temporary binders, emulsifiers, etc. As is fully described in the literature (see for example Kim U.S. Pat. No. 3,238,151, previously alluded to), volatile organics such as ethyl cellulose, butyl carbitol, and synosol, may be used for these purposes. Inert fillers, such as $TiO_2$, may be added too at this stage where one desires to rapidly adjust conductivity values demanded. The resulting pastes are fully blended to achieve uniformity, are formed into desired configurations, and fired. Temperatures utilized are typically in the range of 740° to 1,000° C., and will be sufficient to return the devitrified germanate materials (or, in those instances where the crystalline material has been formed via a solid-state reaction, to convey such materials for the first time) to a true glass form. The resulting glaze materials are then air quenched, and depending upon the particular requirements for the resulting resistive, or conductive, material, may be subjected to an annealing cycle.

The following specific examples illustrate representative embodiments of the present invention. It is to be understood that such examples are for purposes of illustration only, and the scope of the present invention is not to be limited thereby. In all cases cited in the examples, percentage figures are to be construed as having reference to weight.

EXAMPLE I

The composition for the crystalline material was prepared from the following oxides:

| | |
|---|---|
| PbO | 50% |
| $GeO_2$ | 45% |
| $B_2O_3$ | 2% |
| $Al_2O_3$ | 1% |
| $ZrO_2$ | 1% |
| $Bi_2O_3$ | 1% |

The stated composition was intimately mixed in an alcohol medium, dried, then melted in a platinum crucible for 15 minutes at 950° C. The melt was poured into a preheated mold, cooled and broken, and milled into a 20μ powder. A quantity of this powder was pelletized at 4,000 p.s.i. pressure, and calcined at 700° C. for 5 minutes. The pellet was then ground to a 20μ powder. Petrographic and X-ray analysis revealed the crystalline nature of the powder.

The crystalline material was thereupon intimately mixed with conductive components as follows:

| | |
|---|---|
| crystalline material | 88% |
| Au (Colloidal paste supplied by Englehard Industries) | 8.04% |
| $PtO_2$ (−20μ, supplied by Johnson, Mabey and Mallory) | 1.2% |
| $RuO_2$ (−20μ, supplied by J. Bishop & Co. Platinum Works) | 2.76% |

Small amounts of cellosolve acetate, a proprietary organic solvent available from Union Carbide, and pine oil were added to this mixture, and the paste was silk-screened onto a ceramic substrate. The element was heated at the rate of 17° C./min. to a final firing temperature of 810° C. The resistance values and associated TCR's for a number of elements were as follows (in each such instance measured lengthwise across a strip having the approximate dimensions 13 mm. × 2 mm. and an average thickness of 1.5 mils):

| Resistance in Ohms | TCR (p.p.m./°C.) |
|---|---|
| 341.3 K | −88 |
| 307.3 k | −80 |
| 360.2 K | −78 |

It should be noted that the variation in electrical parameters displayed among the several samples is very small, a result that is all the more remarkable when one considers that no special techniques were utilized in the screen printing methods employed to deposit the paste: where ordinary screen-printing is utilized some degree of variation in film thickness of paste is inevitable.

EXAMPLE II

Crystalline material in accordance with Example 1 was prepared and intimately mixed with conductive components in the following proportions:

| | |
|---|---|
| Crystalline Material | 88% |
| Au | 9% |
| $RuO_2$ | 3% |

Small amounts of pine oil and cellosolve acetate were added to the mixture, and the paste was silk-screened onto a substrate. The elements were heated at 25° C./min. and fired in air at a number of temperatures. The resistance values (measured as in example I), TCR values and firing temperatures were as follows:

| Firing Temp. in °C. | Resistance in Ohms | TCR (p.p.m./°C.) |
|---|---|---|
| 740 | ∞ | |
| 765 | 1.492 Meg. | −84 |
| 775 | 782.2 K | +64 |
| 788 | 160.7 K | +190 |
| 810 | 105.5 K | +290 |

In connection with this example, it should be noted that the resistance values of successive samples are a distinct function of the firing temperature utilized. In actual practice it has been found that the variation cited yields a highly dependable method for preparing resistors of a given value range; starting with a single constant composition one can achieve the desired resistance range in the fired product by merely using a firing temperature found to correspond. While it has in the past been observed that firing temperatures of electroconductive glazes have an influence on the resulting conductivities, relationships between the two were too inexact in such prior art to yield workable techniques. In the case of the present germanate materials, however, the crystalline nature of the materials results, as has been previously mentioned, in a very sharp melting point, which in turn yields precise physical conditions for the inundation of the conductive particles which occurs in the course of further heating. The presence of such well-defined inundating conditions is believed to be the principal reason why one can with the present compositions so effectively control resistive values by choice of temperatures, the theory being that for given time periods of heating, progressive physical and/or chemical bonding between dispersed phase and matrix will occur in a predictable and therefore reproducible manner.

EXAMPLE III

Crystalline material prepared in a manner similar to that described in connection with examples I and II was prepared, but having in the present instance the following composition:

| | |
|---|---|
| PbO | 48% |
| $GeO_2$ | 45% |
| $B_2O_3$ | 2% |
| ZnO | 2% |
| $Al_2O_3$ | 1% |
| $ZrO_2$ | 1% |
| $MnO_2$ | 1% |

The crystalline material was again reduced to a $20\mu$ powder, and was intimately mixed with metals and metal oxides in the following proportions:

| | |
|---|---|
| Crystalline Material | 88% |
| Au | 9% |
| $RuO_2$ | 3% |

Small amounts of pine oil and cellosolve acetate were added to the mixture, and the paste was silk-screened onto a ceramic substrate. The elements were heated at 17° C./min. and fired in air at 800° C.

The resistance values and TCR's of representative fired elements are as follows:

| Resistance in Ohms | TCR (p.p.m./°C.) |
|---|---|
| 155.9 K | +34 |
| 162.3 K | +38 |
| 127.6 K | +45 |

EXAMPLE IV

The crystalline material in this instance was prepared from the following composition:

| | |
|---|---|
| $GeO_2$ | 70% |
| PbO | 25% |
| $In_2O_3$ | 5% |

The crystalline material was reduced to a $20\mu$ powder, and was intimately mixed with metals and metal oxides in the following proportions:

| | |
|---|---|
| Crystalline Material | 60% |
| Au | 34% |
| $RuO_2$ | 6% |

Small amounts of pine oil and cellosolve acetate were added to the mixture, and the paste was silk-screened onto a ceramic substrate. The elements were heated at 17° C./min. and fired in air at 980° C.

The resistance values and TCR's of representative final elements were as follows:

| Resistance in Ohms | TCR (p.p.m./°C.) |
|---|---|
| 26.7 K | −135 |
| 26.5 K | −135 |
| 31.0 K | −146 |

EXAMPLE V

The crystalline material in this instance was prepared from the following oxides:

| | |
|---|---|
| PbO | 50% |
| $GeO_2$ | 45% |
| $B_2O_3$ | 2% |
| $Al_2O_3$ | 1% |
| $ZrO_2$ | 1% |
| $Bi_2O_3$ | 1% |

The crystalline material was sintered in pellet form at 700° C. for 5 minutes containing calculated amounts of Au and Pt. The pellet was ground to a $20\mu$ powder, weighed, and known quantities of $RuO_2$ and $PtO_2$ added. The composition of the final powder was:

| | |
|---|---|
| Crystalline Material | 65% |
| Au | 20% |
| Pt | 5% |
| $PtO_2$ | 6% |
| $RuO_2$ | 4% |

Small amounts of pine oil and cellosolve acetate were added to the mixture, and the paste was silk-screened onto a substrate. The elements were heated at 17° C./min. and fired in air at 810° C.

Resistance values and TCR's of representative samples were as follows:

| Resistance in Ohms | TCR (p.p.m./°C.) |
|---|---|
| 12.6 K | +51 |
| 9.8 K | +63 |
| 11.4 K | +61 |

While the present invention has been particularly described in terms of specific embodiments thereof, it will be understood in view of the instant disclosure, that numerous variations thereon and modifications thereof may now be readily devised by those skilled in the art, without yet departing from the true teaching herein. Accordingly, the invention is to be broadly construed, and limited only by the scope and spirit of the claims now appended hereto.

What is claimed is:

1. An electroconductive glaze comprising a dispersion of finely divided conductive particles in a lead germanate glass matrix.

2. A composition according to claim 1 wherein said glass is a lead borogermanate.

3. A composition according to claim 1 wherein said glass is a lead indogermanate.

4. A composition according to claim 1 wherein said conductive component comprises between 10 to 40 percent by weight, and said lead germanate comprises the remainder by weight, of said total composition.

5. An electroconductive glaze composition comprising a dispersion of finely powdered gold, platinum oxide, and ruthenium dioxide in a lead germanate glass matrix, the proportions of dispersed phase to matrix being in the range by weight 4 to 30 percent gold, 4 to 20 percent platinum oxide, 2 to 10 percent ruthenium oxide, and 60 to 90 percent lead germanate glass matrix.

6. A composition according to claim 5, further including up to 5 percent powdered platinum.

7. A paste suitable for firing into an electroconductive glaze comprising: a mixture of finely divided electrically conductive particles, finely divided crystalline lead germanate material, and temporary binders, the ratio present between said conductive component and said crystalline germanate material being in the range 40 to 10 p.p.h. by weight of said conductive component to 60 to 90 p.p.h., by weight of said crystalline germanate material.

8. A composition according to claim 7 wherein said material is a lead borogermanate.

9. A composition according to claim 7 wherein said material is a lead indogermanate.

10. A composition according to claim 7 wherein said conductive component comprises gold, platinum oxide, and ruthenium oxide.

11. A composition according to claim 10, further including powdered platinum.

12. A composition according to claim 11 wherein said conductive component comprises by weight of the combined conductive component and crystalline material, 4 to 20 percent gold, 4 to 20 percent platinum oxide, 2 to 6 percent ruthenium oxide, and 0 to 5 percent platinum.

13. A method for forming an electroconductive glaze comprising: admixing a crystalline lead germanate powder with finely divided conductive particles and temporary binders, and firing said admixture to yield said glaze.

14. A method according to claim 13 wherein said particles are selected from the group consisting of the noble metals and the noble metal oxides.

15. A method for forming an electroconductive glaze exhibiting stable electrical resistance characteristics with respect to temperature variation, comprising:
 a. forming a crystalline lead germanate powder;
 b. admixing said crystalline powder with conductive particulate matter in the ratio range of 40 to 10 p.p.h., by weight conductive component to 60 to 90 p.p.h., by weight of crystalline powder, and adding temporary binders to yield a paste; and
 c. firing said paste to form said glaze.

16. A method in accordance with claim 15 wherein said crystalline lead germanate powder is formed by:
 a. fusing germanium oxide and lead oxide together with oxides selected from the group consisting of boron oxide, indium oxide zinc oxide, aluminum oxide, zirconium oxide, manganese dioxide, and bismuth oxide, to yield a lead germanate glass;
 b. comminuting said glass to a fine powder; pressure compacting and heat treating said comminuted glass to crystallize said material; and comminuting said crystallized material to yield said powder.